United States Patent
Albano et al.

(10) Patent No.: US 12,200,745 B2
(45) Date of Patent: Jan. 14, 2025

(54) INTERFERENCE DETECTION AND REMEDY

(71) Applicant: Comcast Cable Communications, LLC, Philadelphia, PA (US)

(72) Inventors: Christopher Albano, Medford, NJ (US); Christopher Bastian, Glenmoore, PA (US); David Urban, Downingtown, PA (US); Ravi Kiran Gundu, Secane, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 283 days.

(21) Appl. No.: 17/373,413

(22) Filed: Jul. 12, 2021

(65) Prior Publication Data

US 2022/0104205 A1    Mar. 31, 2022

Related U.S. Application Data

(63) Continuation of application No. 14/577,077, filed on Dec. 19, 2014, now Pat. No. 11,102,787.

(51) Int. Cl.
*H04L 12/28* (2006.01)
*H04L 65/612* (2022.01)
(Continued)

(52) U.S. Cl.
CPC ....... *H04W 72/541* (2023.01); *H04L 12/2801* (2013.01); *H04L 65/612* (2022.05); *H04L 65/762* (2022.05); *H04L 65/80* (2013.01); *H04W 24/08* (2013.01); *H04W 72/542* (2023.01); *H04B 1/1027* (2013.01); *H04B 2001/1072* (2013.01)

(58) Field of Classification Search
CPC . H04L 12/2801; H04L 65/612; H04L 65/762; H04L 65/80; H04W 24/08; H04W 72/541; H04W 72/542; H04B 1/1027; H04B 2001/1072
See application file for complete search history.

(56) References Cited

U.S. PATENT DOCUMENTS

| 9,271,311 B1 | 2/2016 | Gurney et al. |
| 2004/0062216 A1* | 4/2004 | Nicholls ............ H04B 1/71 370/320 |

(Continued)

FOREIGN PATENT DOCUMENTS

| CN | 101137165 B | 6/2010 |
| EP | 1 786 153 A2 | 5/2007 |

OTHER PUBLICATIONS

Office Action issued in Canadian Patent Application No. 2,915,697, dated Jan. 11, 2022, 5 pages.

(Continued)

*Primary Examiner* — Melvin C Marcelo
*Assistant Examiner* — Natali Pascual Peguero
(74) *Attorney, Agent, or Firm* — Ballard Spahr LLP

(57) ABSTRACT

Provided are methods and systems for, in some aspects, mitigating interference over a communication channel. In an aspect, a device can be configured to detect interference and to dynamically reconfigure to avoid interference. Such a device can be configured to receive content over various communication channels and can intelligently select a communication channel to avoid interference.

23 Claims, 11 Drawing Sheets

(51) Int. Cl.
*H04L 65/75* (2022.01)
*H04L 65/80* (2022.01)
*H04W 24/08* (2009.01)
*H04W 72/54* (2023.01)
*H04W 72/541* (2023.01)
*H04W 72/542* (2023.01)
*H04B 1/10* (2006.01)

(56) References Cited

U.S. PATENT DOCUMENTS

| | | |
|---|---|---|
| 2005/0227623 A1 | 10/2005 | Su et al. |
| 2007/0099584 A1 | 5/2007 | Niu et al. |
| 2007/0109991 A1 | 5/2007 | Bennett |
| 2008/0134277 A1 | 6/2008 | Tucker |
| 2008/0253308 A1 | 10/2008 | Ward et al. |
| 2009/0149134 A1 | 6/2009 | Gunnarsson et al. |
| 2010/0030887 A1* | 2/2010 | Mousseau ............... H04W 4/18 709/224 |
| 2012/0115421 A1* | 5/2012 | Wu ..................... H04H 20/62 455/62 |
| 2013/0042280 A1 | 2/2013 | Chen |
| 2013/0219435 A1 | 8/2013 | Pattison |
| 2013/0276072 A1 | 10/2013 | Matti et al. |
| 2014/0139747 A1 | 5/2014 | Waller et al. |
| 2015/0044980 A1 | 2/2015 | Eddowes |
| 2015/0150070 A1 | 5/2015 | Gibbon et al. |
| 2016/0007403 A1 | 1/2016 | Futaki et al. |
| 2016/0381565 A1 | 12/2016 | Oteri et al. |

OTHER PUBLICATIONS

European Search Report was issued on Apr. 25, 2016 by the European Patent office for EP Application No. 15200565.8, which was filed on Dec. 16, 2015 and published as 3035604 on Jun. 22, 2016 (Inventor-Christopher Albano et al; Applicant-Comcast Cable Communications, LLC) (2 pages).

* cited by examiner

INTERFERENCE DETECTION AND REMEDY

CROSS REFERENCE TO RELATED APPLICATION

This application is a continuation of U.S. patent application Ser. No. 14/577,077 filed Dec. 19, 2014, which is herein incorporated by reference in its entirety.

BACKGROUND

Wireless devices such as mobile phones can receive data over various frequencies using standards. As the number of wireless devices increases, demands on associated systems and frequencies used to enable and support wireless communications are expanding. As a consequence, frequency bands that were previously used for certain communications, such as video and data communications, may now experience interference. These and other shortcomings are uncovered and addressed by the present disclosure.

SUMMARY

It is to be understood that both the following general description and the following detailed description are exemplary and explanatory only and are not restrictive. Provided are methods and systems for, in some aspects, mitigating interference over a communication channel. In an aspect, a device can detect interference and can be dynamically reconfigured to avoid the interference. Such a device can receive content over various communication channels and can intelligently select a communication channel to avoid interference.

In an aspect, methods and systems provided can determine one or more signal metrics associated with one or more signals transmitted via a communication path. Interference can be detected in the one or more signals and a strength of the interference can be determined based on the one or more signal metrics. A communication or action, such as an alert, can be provided (e.g., generated, transmitted, etc.) if the interference strength exceeds a threshold value.

In an aspect, the methods and systems provided can receive one or more signals via a communication path. An interference signal that exceeds an interference threshold can be detected amongst the one or more signals. The interference signal can be a signal that affects the one or more signals received via the same or different communication path. Interference information relating to the interference signal can be determined and processed internally or transmitted to one or more other devices/systems. Tuning information based on the interference information can be determined or received and can be used for device configuration to circumvent the interference signal. Also or in the alternative, the interference information can be used to determine and provide instructions for otherwise circumventing the interference signal.

In an aspect, the methods and systems provided can receive one or more signals transmitted via a communication path. Each of the one or more signals can be transmitted at a respective center frequency. Aggregate signal power associated with each of the one or more received signals can be measured. The aggregate signal power can comprise power associated with data, power associated with interference, and the like. In an aspect, an interference signal power can be determined in a band gap frequency range. A band gap can be a space between two signals where no signal should appear. A band gap frequency range can be the range of frequencies in a band gap. The interference signal power can relate to an interference signal affecting the one or more signals. A signal-to-noise ratio can be determined by dividing the determined interference signal power by the measured aggregate signal power associated with one of the one or more affected signals. A communication or action, such as an alert or a remedial action can be taken or provided (e.g., generated, transmitted, implemented, etc.) if the signal-to-noise ratio, for example, drops below a threshold value.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1A:
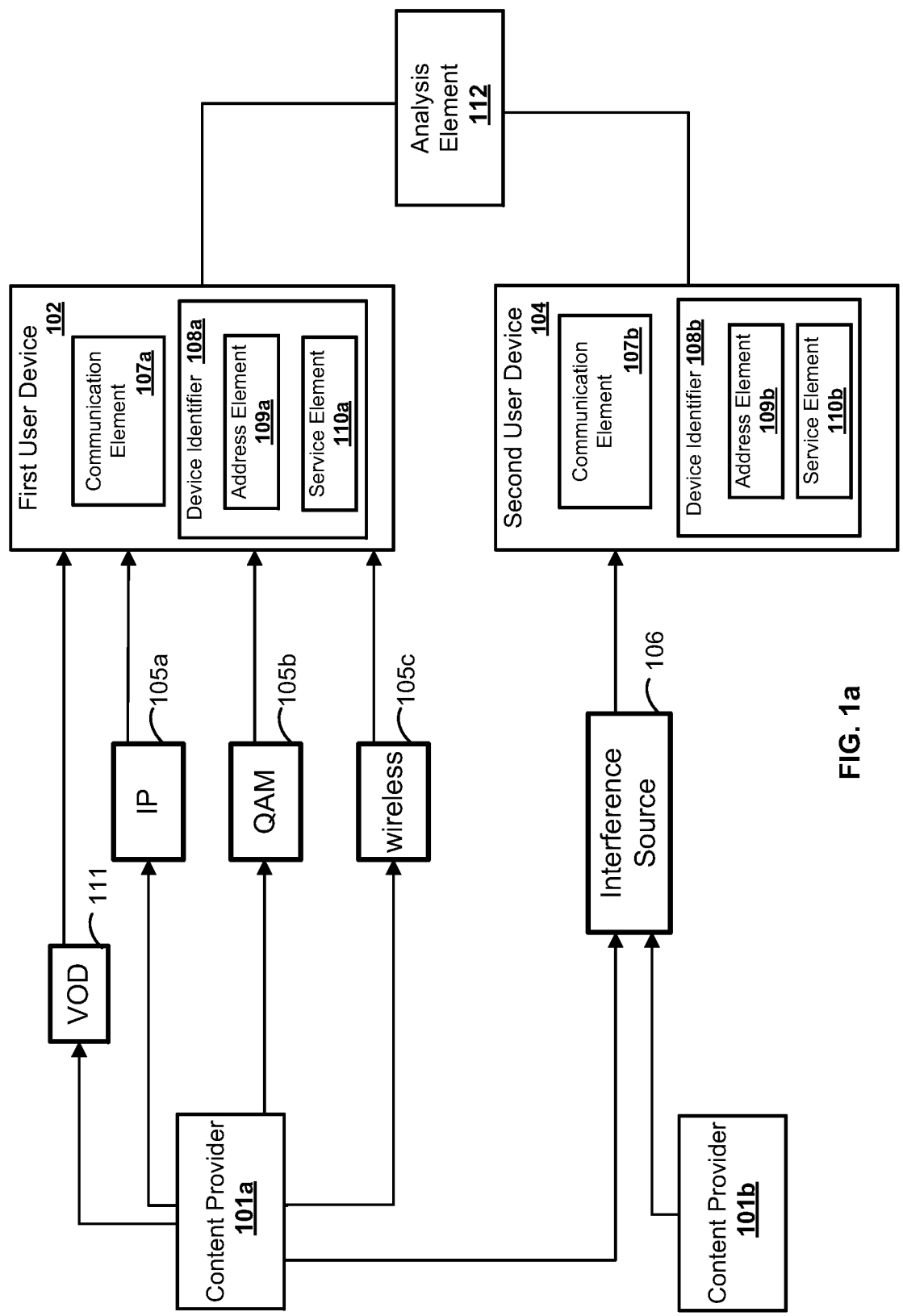
FIG. 1a illustrates various aspects of an exemplary system in which the present methods and systems can operate.
Figure 1B:
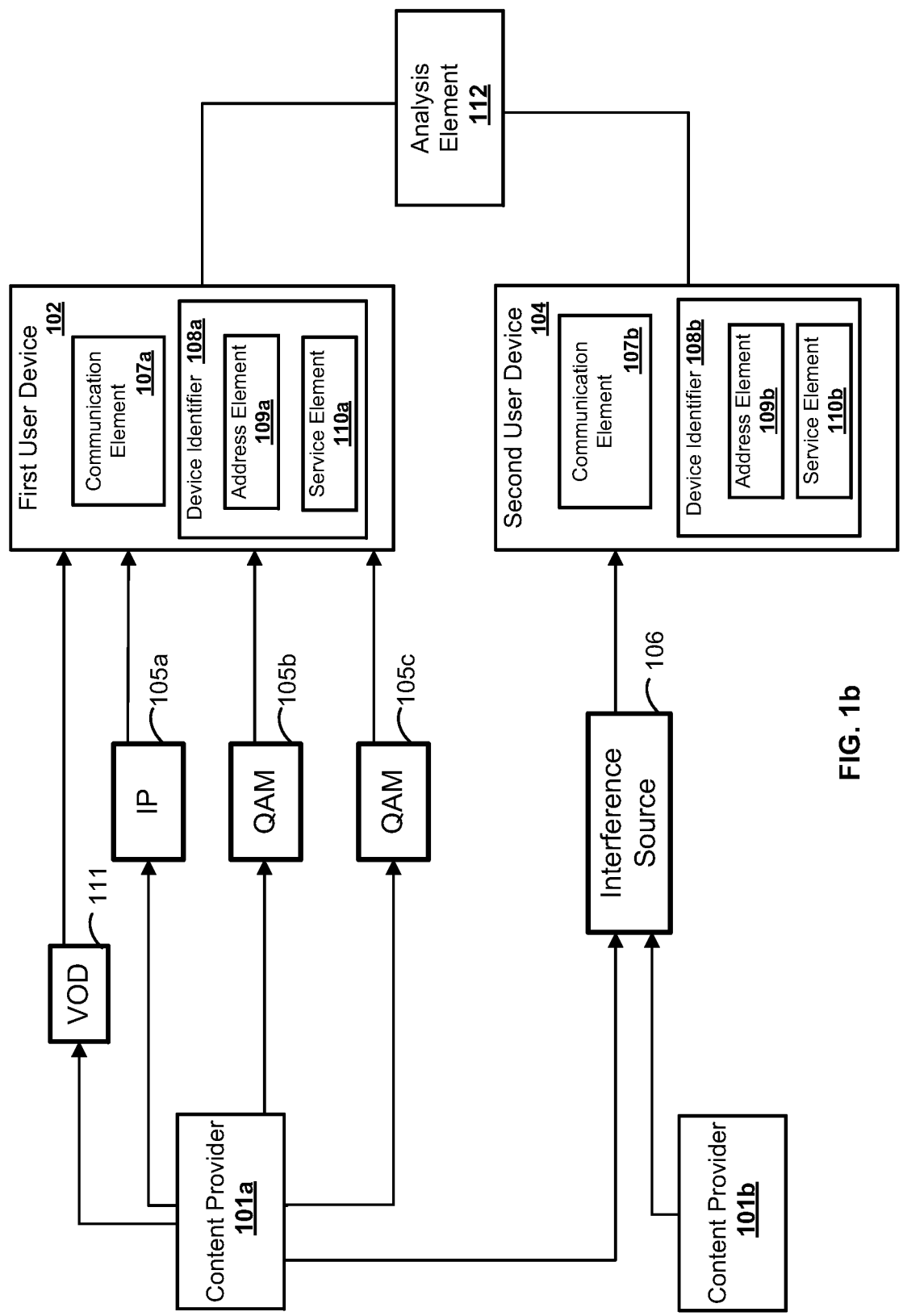
FIG. 1b illustrates various aspects of an exemplary system in which the present methods and systems can operate.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Provided are methods and systems for, among other things, detecting and mitigating interference over a communication channel. In an aspect, a computing device can be configured to detect interference and to dynamically reconfigure itself or one or more other devices (e.g., user devices) to avoid and/or address the interference. User devices can be configured to receive content over various communication channels and to intelligently select a communication channel to avoid interference. Detecting interference can comprise monitoring all channels across a frequency spectrum for interference in real-time and detecting interference on any of the channels in real-time. In an example, the methods and systems can monitor the interference on various channels delivered to a user terminal such as a set-top box, smart TV, smart phone, etc. In one example, if a channel with content currently being consumed, e.g., displayed on a display device, has a high noise to signal ratio, the methods and systems can cause the terminal to receive the content through an alternative channel, e.g., by tuning or making the terminal lock onto a different channel. In an aspect, if a program being displayed is streamed on a channel experiencing interference and is available on-demand, the methods and systems can cause the program to be delivered to the set-top box from an on-demand server. In the example, the methods and systems can begin playback of the program delivered on-demand at a point in time (e.g., relative to a start time) when the program discontinued being transmitted via the channel experiencing interference. In another example, if the program being displayed is being streamed on a high definition channel experiencing interference, but is available on a standard definition channel, the methods and systems can cause the set-top box to tune to the standard definition channel. In another example, if the program being displayed is being streamed on a standard definition channel experiencing interference, but is available on a high definition channel, the methods and systems can cause the set-top box to tune to the high definition channel.

In an aspect, the disclosed methods and systems can capture signal power, signal-to-noise ratio (SNR), adaptive equalizer measurements, and other signal attributes for content signals being provided via a Customer Premises Equipment (CPE) device at any particular time. For High Speed Data (HSD) devices, signal attributes such as signal power and SNR can be captured in real time on downstream and upstream channels associated with the CPE device. After data associated with the CPE device is captured, one or more metrics related to an interference can be reported to an operation support system (OSS), and impact to the CPE device can be determined in the OSS. The impact can be based on an interfering signal power, a CPE signal power, one or more SNR values, and the like. In another aspect, the OSS system can determine an alarm level (e.g., warning, critical alarm) caused by the interference. The disclosed methods and systems can capture data consistently and use the captured data for various operations, such as system diagnostics and planning.

One or more corrective actions can be taken based on the impact of interference. As an example, if content being impacted by a LTE system is available via an on-demand system, the on-demand system can start to provide the content at a current time point of the content being impacted by the LTE system. If the content being impacted by the LTE system is not available via an on-demand system, then a set-top box can scan and tune to the same content that is being delivered on another frequency or channel, for example, from HD channel to SD channel. The set-top box can tune away from an impacted frequency when an interference is detected, and tune back when the interference dissipates. The systems and methods can be applied in a home environment in which multiple devices are interconnected and can interfere with each other.

FIGS. 1a,b-2a,b illustrate various aspects of an example method and system in which the present methods and systems can operate. In an aspect, one or more content providers 101a, 101b (e.g., source) can provide content to a first user device 102 and/or a second user device 104. In an aspect, the content provider 101a, 101b can be configured as (or disposed at) a central location (e.g., a headend, or processing facility), which can create or receive content (e.g., data, input programming) from multiple sources. In an aspect, the content provider 101a, 101b can combine the content from the multiple sources and can distribute the content to user (e.g., subscriber) locations via a distribution system. There can be a multitude of user locations connected to the distribution system. The signals provided by the content provider 101a, 101b can include a single content item or a multiplexed signal that includes several content items. For example, the signals provided by content provider 101a, 101b can comprise playable content and metadata associated with the playable content. In an aspect, the content provider 101a, 101b can carry pay-per-view service or video on-demand service. In an aspect, the content provider 101a, 101b can be configured to provide content via similar or different types of network technologies (e.g., packetized network, non-packetized network). As an example, the content provider 101a, 101b can provide first content to the first user device 102 via a first network (e.g., quadrature amplitude modulation (QAM) network). As another example, the same or different content provider 101a, 101b can provide second content to the second user device 104 via a second network (e.g., a wireless network, such as a Long Term Evolution (LTE) network). Other networks, standards, specifications, modulation schemes, and the like can be used to communicate with one or more of the first user device 102 and the second user device 104.

In an aspect, the first user device 102 can be a device or system capable of accessing the first network such as a QAM network. As an example, the first user device 102 can comprise a set-top box, programmable consumer electronics, a smart phone, a computer, a tablet, a mobile device, a television (TV), a vehicle entertainment system, a communications terminal, or the like. In an aspect, the first user device 102 does not need to be in a fixed location and can be deployed in any location convenient to communicate with the content provider 101a, 101b.

In an aspect, the second user device 104 can be a device or system that is capable of accessing the second network such as a wireless (e.g., an LTE) network or other network that can interfere with the communications of the first network. In an aspect, the second user device 104 can comprise a set-top box, programmable consumer electronics, a smart phone, a computer, a tablet, a mobile device, a PDA, a TV, a vehicle entertainment system, a communications terminal, or the like. In an aspect, the second user device 104 does not need to be in a fixed location and can be deployed in any location convenient to communicate with the content provider 101a, 101b.

In an aspect, the first network can implement one or more transmission mechanisms such as modulation techniques, standards, and/or specifications. As an example, the first network can implement quadrature amplitude modulation. In another aspect, the first network can comprise one or more communication channels 105a, 105b, 105c, 111. In an aspect, the content provider 101a, 101b, can transmit content via one or more of the communication channels 105a, 105b, 105c, 111. The communication channels can comprise QAM and/or wireless channels 105b, 105c, internet protocol (IP) channels 105a, and/or video on-demand (VOD) 111. As an example, the one or more user devices (e.g., first user device 102 and/or second user device 104) can be selectively and/or automatically tuned to one or more of the communication channels 105a, 105b, 105c, 111 to receive the content transmitted via the communication channels 105a, 105b, 105c, 111. In another aspect, each of the QAM and/or wireless channels 105b, 105c can be associated with a particular frequency and/or frequency band. As an example, one or more signals can be transmitted at a respective center frequency of the associated communication channel 105a, 105b, 105c, 111. One or more communication channels 105a, 105b, 105c, 111 can be associated with a particular level of service, such as a resolution (e.g., HD, SD, and the like). As an example, one or more communication channels 105a, 105b, 105c, 111 can be associated with high definition (HD) content. As another example, one or more communication channels 105a, 105b, 105c, 111 can be associated with standard definition (SD) content. One or more communication channels 111 can be associated with video on-demand (VOD) content. In an aspect, the first network can comprise a video on-demand server. The video on-demand server can transmit content via end-to-end IP delivery, QAM channels, wireless channels, or any other medium of content delivery.

In an aspect, the second network can implement one or more transmission mechanisms such as modulation techniques, standards, and/or specifications. As an example, the second network can implement orthogonal frequency division multiplexing. In another aspect, the second network can comprise a channel that is an interference source 106, such as a wireless channel. In an aspect, the wireless channel 106 can be an LTE channel. In an aspect, the content provider 101a, 101b, can transmit data or content via the LTE channel 106 or over another channel of communication such as end-to-end IP delivery. Although this aspect is described in terms of an LTE network, LTE is an example only and the disclosure is not so limited. As an example, the one or more user devices (e.g., first user device 102 and/or second user device 104) can be selectively and/or automatically tuned to the LTE channel 106 to receive the content transmitted via the LTE channel 106. In another aspect, the LTE channel 106 can be associated with a particular frequency and/or frequency band. As an example, one or more signals can be transmitted at a respective center frequency of the associated LTE channel 106. In a further aspect, multiple LTE channels 106 can be provided covering a range of frequencies. As an example, communications via the frequency range associated with the LTE channel 106 can cause interference with communications via one or more of the communication channels 105a, 105b, 105c, 111. As another example, a bandwidth of the LTE channel 106 can be smaller than a bandwidth of a communication channel 105a, 105b, 105c, 111 relating to a particular frequency. A band gap can be a space between the boundaries of two signals of consecutive frequencies containing signals. Due to the difference in bandwidth, a band gap between the channels can be monitored to determine the interference of one signal over another signal. In an aspect, a band gap between two communication channels can be monitored to determine if an LTE signal is interfering with one or more of the communication channels. In another aspect, a band gap between two QAM channels can be monitored to determine if an LTE signal is interfering with one or more of the QAM channels. The systems and methods of the present disclosure can facilitate mitigation of such interference.

In an aspect, the first user device 102 can comprise a communication element 107a. The communication element 107a can comprise software, hardware, and/or interfaces for presenting and/or receiving information to/from a user. For example, a user of the first user device 102 can request an application (e.g., an Enhanced TV Binary Interchange Format (EBIF) application, and the like) via the communication element 107a. As another example, the communication element 107a can transmit an action or feedback of the user of the first user device 102 or state of the first user device 102 to an analysis element 112. In another aspect, the communication element 107a can request or transmit data from/to a local source and/or a remote source. In an aspect, the communication element 107a can be configured to utilize a wired and/or wireless network using QAM, Wi-Fi, Bluetooth, MoCA, DLNA, Ethernet or any desired method or standard.

In an aspect, the second user device 104 can comprise a communication element 107b. The communication element 107b can comprise software, hardware, and/or interfaces for presenting and/or receiving information to/from a user. For example, a user of the second user device 104 can present a request for information via the communication element 107b. As another example, the communication element 107b can request or transmit data from/to a local source and/or a remote source. As another example, the communication element 107b can transmit an action or feedback of the user of the second user device 104 or state of the second user device 104 to the analysis element 112. In an aspect, the communication element 107b can be configured to utilize a wired and/or wireless network using LTE, Wi-Fi, Bluetooth, MoCA, DLNA, Ethernet or any desired method or standard.

In an aspect, the first user device 102 can be associated with a user identifier or device identifier 108a. As an example, the device identifier 108a can be any identifier, token, character, string, or the like, for differentiating one user or device from another user or device. In a further aspect, the device identifier 108a can identify a user or user device as belonging to a particular class of users or user devices. As a further example, the device identifier 108a can comprise information relating to the user device, such as a manufacturer, a model or type of device, a service provider associated with the first user device 102, a state of the first user device 102, a locator, and/or a label or classifier. Other information can be represented by the device identifier 108a. As an example, user identifier or device identifier 108a can be part of a trigger signal. As another example, a content provider (e.g., content provider 101a, 101b) can provide first content to first user device 102 according to its user identifier or device identifier 108a. As another example, user or device identifier 108a can be used by the analysis element 112 to authenticate a user or user device (e.g., first user device 102).

In an aspect, the device identifier 108a can comprise an address element 109a and a service element 110a. In an aspect, the address element 109a can comprise or provide an internet protocol address, a network address, a media access control (MAC) address, an Internet address, or the like. As an example, the address element 109a can be relied upon to establish a communication session between the first user device 102 and other network devices or systems, such as the content provider 101a, 101b. As a further example, the address element 109a can be used as an identifier or locator of the first user device 102. In an aspect, the address element 109a can be persistent for a particular network. As an example, address element 109a can be part of the request for an application and trigger signal. As another example, a content provider (e.g., content provider 101) can provide first content to the first device 104 at its location according to its address element 109a. As another example, address element 109a can be used by the analysis element 112 to authenticate a user or user device (e.g., first user device 102).

In an aspect, the service element 110a can comprise an identification of a service provider associated with the respective device and/or with the class of device. The class of the device can be related to a type of device, capability of device, type of service being provided, and/or a level of service (e.g., business class, service tier, service package, etc.). As an example, the service element 110a can comprise information relating to or provided by a content service provider (e.g., the content provider 101a, 101b) that is providing or enabling data flow such as communication services to the respective device. As a further example, the service element 110a can comprise information relating to a preferred service provider for one or more particular services relating to the first user device 102. In an aspect, the address element 109a can be used to identify or retrieve data from the service element 110a, or vice versa. As an example, service element 110a can comprise information relating to a content provider for a specific user or device. As another example, service element 110a can comprise information relating to a pay-per-view service or video on-demand service a specific user or device is entitled to access. In an aspect, the second user device 104 can be associated with a user identifier or device identifier 108b. As an example, the device identifier 108b can be any identifier, token, character, string, or the like, for differentiating one user or device from another user or device. In a further aspect, the device identifier 108b can identify a user or user device as belonging to a particular class of users or user devices. As a further example, the device identifier 108b can comprise information relating to the user device, such as a manufacturer, a model or type of device, a service provider associated with the second user device 104, a state of the second user device 104, a locator, and/or a label or classifier. Other information can be represented by the device identifier 108b. As an example, user identifier or device identifier 108b can be part of the request for information and request for second content. As another example, user identifier or device identifier 108b can be used by the analysis element 112 to authenticate a user or user device. As another example, a content provider (e.g., content provider 101a, 101b) can provide second content to second user device 104 according to its user identifier or device identifier 108b.

In an aspect, the device identifier 108b can comprise an address element 109b and a service element 110b. In an aspect, the address element 109b can comprise or provide an internet protocol address, a network address, a media access control (MAC) address, an Internet address, or the like. As an example, the address element 109b can be relied upon to establish a communication session between the second user device 104 and other network devices or systems, such as the content provider 101a, 101b. For example, the content provider 101a, 101b can provide second content to the second user device 104 at its location according to its address element 109b. As a further example, the address element 109b can be used as an identifier or locator of the second user device 104. In an aspect, the address element 109b can be persistent for a particular network. As an example, address element 109b can be part of the request for information and/or request for second content. As another example, address element 109b can be used by the analysis element 112) to authenticate a user or user device (e.g., second user device 104).

In an aspect, the service element 110b can comprise an identification of a service provider associated with the respective device and/or with the class of device. The class of the device can be related to a type of device, capability of device, type of service being provided, and/or a level of service (e.g., business class, service tier, service package, etc.). As an example, the service element 110b can comprise information relating to or provided by a content service provider (e.g., content provider 101) that is providing or enabling data flow such as communication services to the respective device. As a further example, the service element 110b can comprise information relating to a preferred service provider for one or more particular services relating to the respective device. In an aspect, the address element 109b can be used to identify or retrieve data from the service element 110b, or vice versa. As an example, service element 110a can comprise information relating to a content provider for a specific user or device (e.g. second user device 104). As another example, service element 110b can comprise information relating to a pay-per-view service or video on-demand service a specific user or device is entitled to access.

In an aspect, the analysis element 112 can comprise software, hardware, and/or interfaces for accessing and/or receiving information from one or more of the content provider 101a, 101b, the first user device 102, the second user device 104, and/or a computing device associated with the first network and/or the second network. The analysis element 112 can be configured to determine (e.g., measure, detect, receive, calculate, estimate, etc.) one or more signal metrics (e.g., device metrics, communication metrics, network metrics, etc.). As an example, the analysis element 112 can be configured to determine one or more of a signal power, signal-to-noise ratio (SNR), and adaptive equalizer measurements for the signal content that is being consumed by a particular device (e.g., first user device 102, second user device 104) at any particular time. As a further example, the analysis element 112 can be configured to determine one or more signal metrics on one or more of (or all) the downstream and/or the upstream channels with which the device is currently connected (e.g., tuned, locked, etc.). In another aspect, the analysis element 112 can be configured to determine the levels at which an alert (e.g., warning, critical alarm) can be triggered. As an example, one or more thresholds can be set for one or more of the determined signal metrics, wherein an alert is triggered when the threshold is met or exceeded. The determined information (e.g., metrics) can be used for various operations such as diagnostics, planning, size of impact, etc. In another aspect, the analysis element 112 can be configured to transmit the determined information (e.g., metrics) to a separate system such as an operation support system (OSS) associated with the content provider. As such, the operations support system can be configured to analyze the determined metrics.

In an aspect, one or more of the first user device 102 and the second user device 104 can be configured (independently or in cooperation with the analysis element 112) to detect interference on a particular frequency (channel) and can dynamically avoid such interference. As an example, if an alert is triggered for one or more determined metrics, the alert can be transmitted to the content provider 101a, 101b and may include details of the alert such as the frequency and/or band of frequencies affected. As such, the content provider 101a, 101b can determine if content is available from another source (e.g., VOD). For example, a particular program can be delivered in high definition via a communication channel, such as QAM and/or wireless channel 105c. In the example, another communication channel, such as QAM channel 105b, can deliver the same particular program in standard definition. The program can also be available via the video on-demand server. In the example, QAM and/or wireless channel 105c can deliver the program presented in a first language and IP channel 105a can deliver the particular program presented in a second language. The first user device 102 can be tuned to a communication channel, such as QAM and/or wireless channel 105c. In the example, content provider 101a, 101b can determine that QAM and/or wireless channel 105c is experiencing interference. Interference can be caused by, for example, the content provider 101a, 101b delivering content to a second user device 104 over an LTE channel 106. Interference can also be caused locally by appliances, such as microwaves or hairdryers. Interference can be caused by lights, power lines, other communication networks, and/or any other source of interference. For example, interference can be caused by police and firefighter (or other public safety) radio communications, amateur radio communications, public radio communications, wireless microphones, legacy paging and cellular systems, radar and telemetry systems, Internet of Things (IoT) sensors, monitoring devices, and atmospheric noise such as lightning and ionosphere tunneling of radio interference. In response to determining QAM and/or wireless channel 105c is experiencing interference, content provider 101a, 101b can cause the first user device 102 to tune to another communication channel, such as QAM channel 105b. Alternatively, content provider 101a, 101b can determine that QAM and/or wireless channel 105c is experiencing interference and cause the first user device 102 to retrieve the program from the video on-demand server. In an aspect, the content provider 101a, 101b can determine the runtime of the program when interference was experienced and begin the program delivered from the video on-demand server at the determined runtime. In an aspect, content provider 101a, 101b can determine that QAM and/or wireless channel 105c is experiencing interference and cause the first user device 102 to tune to IP channel 105a. In an aspect, the content provider 101a, 101b can cause the program to be presented with subtitles in the first language.

Figure 2A:
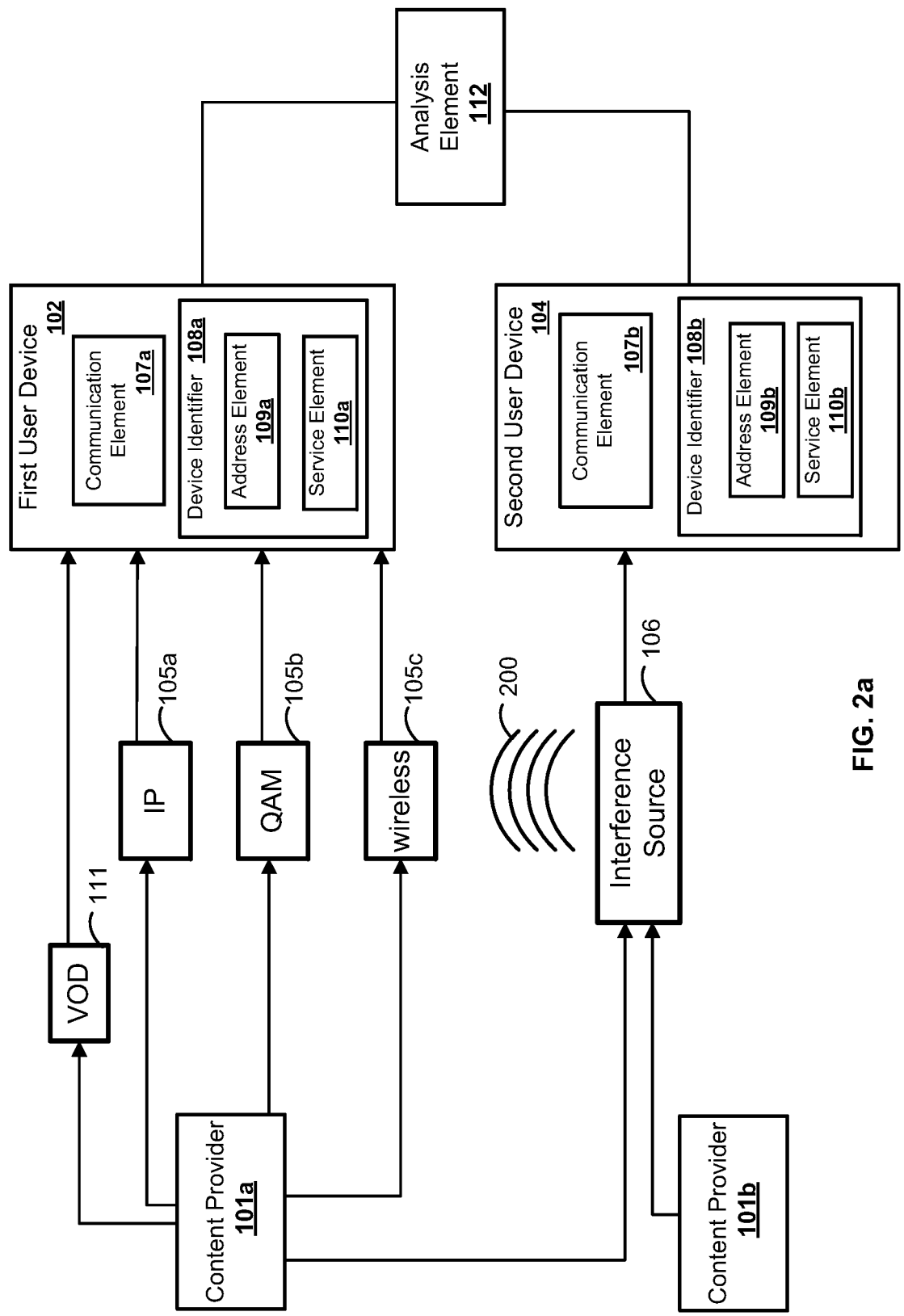
FIG. 2a illustrates various aspects of another exemplary system in which the present methods and systems can operate.
Figure 2B:
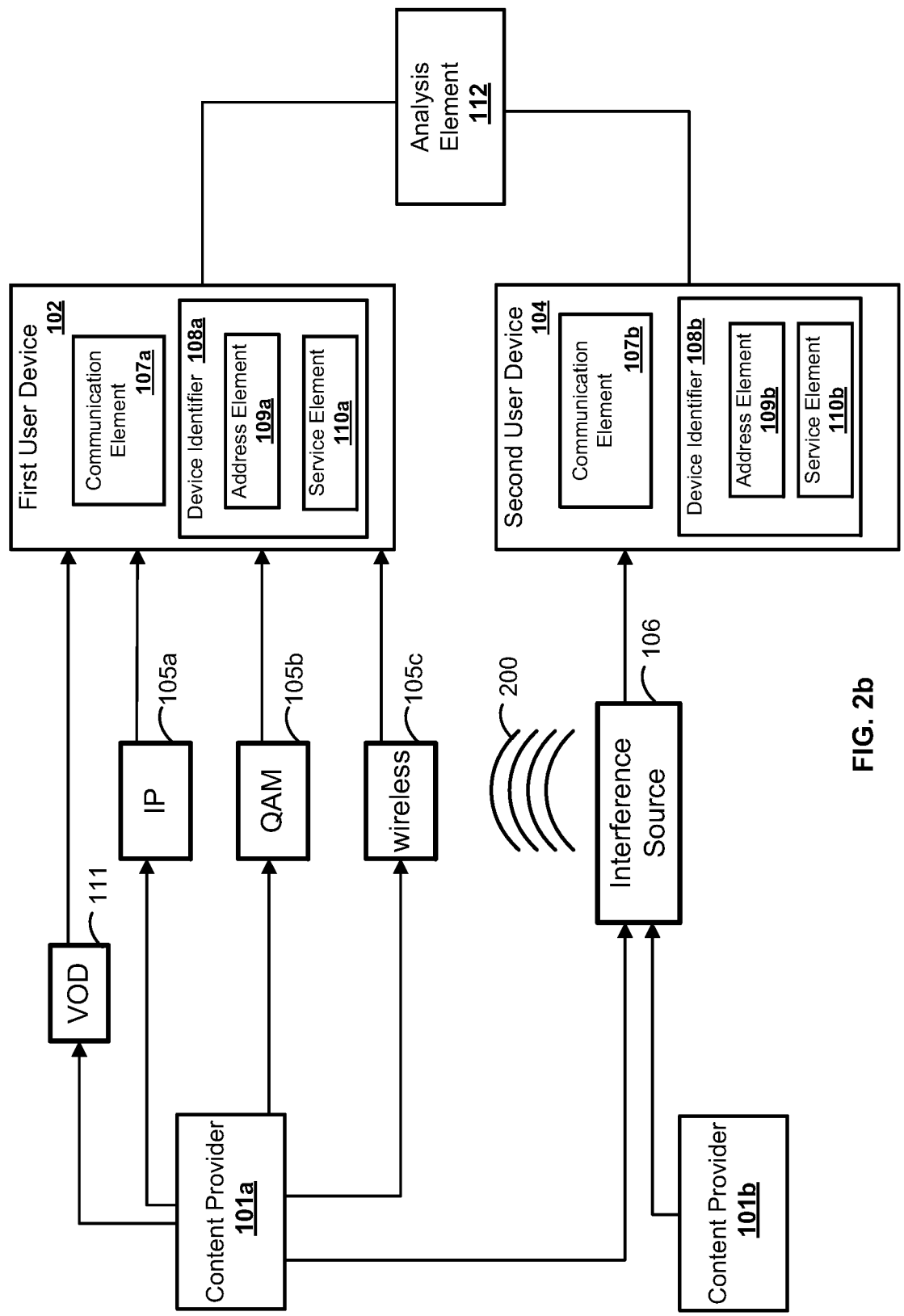
FIG. 2b illustrates various aspects of another exemplary system in which the present methods and systems can operate.

As illustrated in FIG. 2, communications via the frequency range associated with the LTE channel 106 can cause interference (e.g., signal interference 200) with communications via one or more of the communication channels 105a, 105b, 105c, 111. Accordingly, the systems and methods of the present disclosure can facilitate mitigation of such interference. As an illustrative example, the first user device 102 can be consuming a first content via a communication channel, such as the QAM and/or wireless channel 105c. The QAM and/or wireless channel 105c, for example, can experience interference from the LTE channel 106. The channel experiencing interference can be a channel carrying a wireless signal, or carrying a signal over a wired medium such as fiber or coaxial cable. Such interference can affect one or more single metrics determined by the first user device 102 and/or the analysis element 112. As an example, detection of interference can comprise a signal metric meeting and/or exceeding a predefined threshold. As an example, communications via the frequency range associated with the LTE channel 106 can cause interference with communications via the QAM and/or wireless channel 105c. As another example, a bandwidth of the LTE channel 106 can be smaller than a bandwidth of the QAM and/or wireless channel 105c relating to a particular frequencies. Due to the difference in bandwidth, a band gap between the channels can be monitored to determine the interference of one signal over another signal. Once the interference is detected, an alert can be triggered. In response to a triggered alert, one or more of the first user device 102, the analysis element 112, and the content provider 101a, 101b, can determine if the first content can be delivered via a communications path that is an alternative to the QAM and/or wireless channel 105c experiencing interference. As an example, the content provider 101a, 101b can determine that the first content is available on QAM channel 105b or IP channel 105a. As another example, the content provider 101a, 101b can determine that the first content is available as VOD or via an Internet protocol network. Information relating to the alternative channel or source for the content can be transmitted to the first user device 102 to facilitate tuning the first user device 102 to the new channel or source of the first content. In another aspect, an alternative version of the first content can be provided. For example, the first user device 102 can be consuming the first content in high definition via the QAM and/or wireless channel 105c, but could consume the first content in standard definition via QAM channel 105b or VOD, if the QAM and/or wireless channel 105c experiences interference. In an aspect, unlike conventional interference mitigation techniques, the systems and methods of the present disclosure allow the user devices to selectively and dynamically receive content via alternative channels and sources. Such dynamic tuning of the user devices aids in frequency planning by the content providers, as the content providers do not need to permanently avoid certain frequencies.

In an aspect, the content provider 101a, 101b can track a plurality of interferences. The content provider 101a, 101b can choose a different communications path in response to receiving a request for content on a communications path with a tracked interference. In another further aspect, the content provider 101a, 101b can transmit an alert in response to an interference tracked on a communications path. The transmitted alert can comprise one or more interference reports. In an aspect, action to mitigate interference can be taken in response to the transmitted alert. Action to mitigate interference can comprise adjusting the allocation of one or more communications paths to an interfering party. Action to mitigate interference can comprise adjusting the time an interfering party can use one or more communications paths. Action to mitigate interference can comprise restricting the access of an interfering party to one or more communications paths. In another further aspect, action to mitigate interference can comprise communicating with the interfering party.

Figure 3:
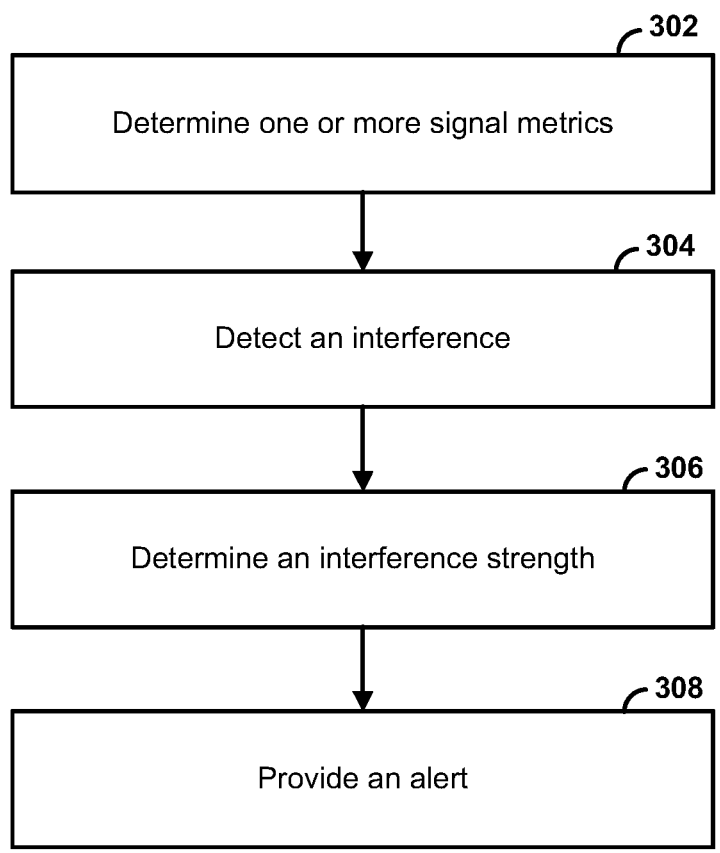
FIG. 3 is a flowchart illustrating an example method.

FIG. 3 is flowchart illustrating an example method. At step 302, one or more signal metrics can be determined. As an example, the one or more single metrics can be determined by a user device (e.g., the first user device 102, the second user device 104) and/or the analysis element 112. In an aspect, the one or more signal metrics can be associated with one or more signals transmitted via a communication channel or a communication path comprising one or more communication channels. In an aspect, the communication channel can be a quadrature amplitude modulation (QAM) channel or a communication path comprising one or more QAM channels. In another aspect, the one or more signal metrics can comprise device a signal power, an adaptive equalizer measurement, and/or a signal-to-noise ratio, or a combination thereof. As an example, the one or more signal metrics can be determined in real-time. In another aspect, the one or more signals can be transmitted at a respective center frequency.

At step 304, an interference can be detected in the one or more signals. In an aspect, one or more of the first user device 102 and the second user device 104 can be configured (independently or in cooperation with the analysis element 112) to detect interference on a particular frequency (channel). In an aspect, the interference can affect the one or more signals received via the communication path. In an aspect, the interference can affect one or more signal metrics associated with the one or more signals. In an aspect, a plurality of attributes about the one or more signals can be known. For example, a center frequency, roll-off factor, bandwidth, and symbol rate can comprise a plurality of attributes that can be known about a signal. For example, the plurality of known attributes can allow the methods and systems to know channel width and channel spacing of the signal. In an aspect, the space between two signals, e.g., a place where the communication path should not be receiving the one or more signals, can be called band gap. In another aspect, detecting the interference can comprise measuring the interference signal power at one or more band gaps. In another aspect, detecting the interference can comprise measuring the interference signal power at one or more band gaps and determining that the interference signal power is higher than a threshold value (e.g., 0 dBm, −10 dBm, −20 dBm). As an example, interference can be caused by an appliance, such as a hairdryer or a microwave. Such interference can be detected by determining that a band gap in between two signals comprises an interference signal power that is higher than a threshold value. In an aspect, the detected interference can be caused by a second transmission mechanism. The band gaps can represent a difference between a bandwidth of a signal and a bandwidth of the second transmission mechanism. As an example, the band gaps can represent a difference between a bandwidth of a QAM signal and a bandwidth of a second transmission mechanism. As another example, the second transmission mechanism can use orthogonal frequency division multiplexing. As a further example, the second transmission mechanism can be long-term evolution (LTE). In an aspect, the band gaps can reveal a difference between a bandwidth of a signal and a bandwidth of the second transmission mechanism. As an example, the band gaps can show a difference between a bandwidth of a QAM signal (e.g., 6 MHz wide) and a bandwidth of a second transmission mechanism (e.g., 10 MHz wide).

In an aspect, channel width and channel spacing of an interfering signal and a desired signal can be different. For example, when the interfering signal is wider than the desired signal, the interference signal can be detected in the presence of the desired signal. Detection of the desired signal can relate to a positive signal-to-noise ratio. This means that the interference signal level is below the desired signal level. In an aspect, the desired signal can have a channel width that is smaller than channel spacing, therefore resulting in a band gap. While signals still exist in the band gap, the levels of the desired signal are much lower in the band gap to prevent co-channel interference. When the level of the desired signal is low in the band gaps, the interfering signal can be detected within the band gap if channel width, channel spacing, and signal characteristics of the interfering signal are known. For example, OFDM signals use pilot subcarriers that transmit a known pattern with a known center frequency and modulation. Some of these pilots fall within a band gap so that a detector that is tuned for the pilots falling in the band gap can be detected even though the desired signal is higher than the interfering signal. Once presence of the pilots and levels of the pilots are detected in the band gap, an estimate can be made on a type of interference and a level of interference within the signal itself based on a known characteristic of the interfering signal. For example, the OFDM signal may be known to have a 711 MHz center frequency and a 10 MHz channel width. Due to the fact that the desired signals are much higher in level, it can be difficult to detect the 10 MHz wide interfering signal. However, if a one or more pilots within the band gaps can be detected that match the expected pilots of the OFDM signal, then an estimation can be made that the interference is an OFDM signal with a 711 MHz center frequency and a 10 MHz channel width having a level around equal to the pilot levels.

At step 306, a strength of the interference can be determined based on the one or more signal metrics. In an aspect, the strength of the interference can be determined by a user device (e.g., the first user device 102, the second user device 104) and/or the analysis element 112. In an aspect, the interference strength can relate to an interference affecting the one or more signal metrics associated with the one or more signals. In another aspect, determining the interference strength can comprise measuring interference strength at one or more band gaps. In an aspect, the band gaps can represent a difference between a bandwidth of a signal and a bandwidth of a second transmission mechanism. As an example, the band gaps can represent a difference between a bandwidth of a QAM signal and a bandwidth of a second transmission mechanism. As another example, the second transmission mechanism can use orthogonal frequency division multiplexing. For example, the second transmission mechanism can use orthogonal frequency division multiplexing for encoding data. As a further example, the second transmission mechanism can be long-term evolution (LTE).

At step 308, an alert can be provided if the interference signal power exceeds a threshold value. In an aspect, the threshold value can be determined by a standard determined by a standards body, such as, for example, CableLabs. As an example, a threshold value of 41 dB could be used for downstream, carrier-to-premises communications. Of course, any other appropriate threshold value can be used.

Optionally, in response to detecting an interference in a signal, customer-premises equipment (CPE) can take corrective action. As an example, the CPE can determine a program on a frequency experiencing interference and determine if the program is available on an alternative channel and/or source. Determining if the program is available on an alternative channel and/or source can comprise examining information, such as information from an electronic programming guide (EPG) and/or metadata. Determining if the program is available on an alternative channel and/or source can comprise searching a database or a search engine. In another example, the CPE can transmit the frequency experiencing interference to a central location, such as a headend or server. The central location can determine a program on a frequency experiencing interference and determine if the program is available on an alternative channel and/or source. In yet another example, the CPE can transmit the frequency experiencing interference and the program on the frequency experiencing interference, and the central location can determine if the program is available on an alternative channel and/or source. If the program is available on an alternative channel and/or source, the CPE can be caused to tune to or otherwise request/receive the program via the alternative channel and/or source. As an example, if an interference is LTE and a device causing the interference has WiFi capability, then the corrective action can comprise tuning the device communications to WiFi, rather than LTE. Alternatively, an interference source (e.g., another user device) can take corrective action. For example, the central location can instruct the interference source to use to an alternative channel, frequency, communication technique, content providing system, and the like, to minimize or remove interference.

Figure 4:
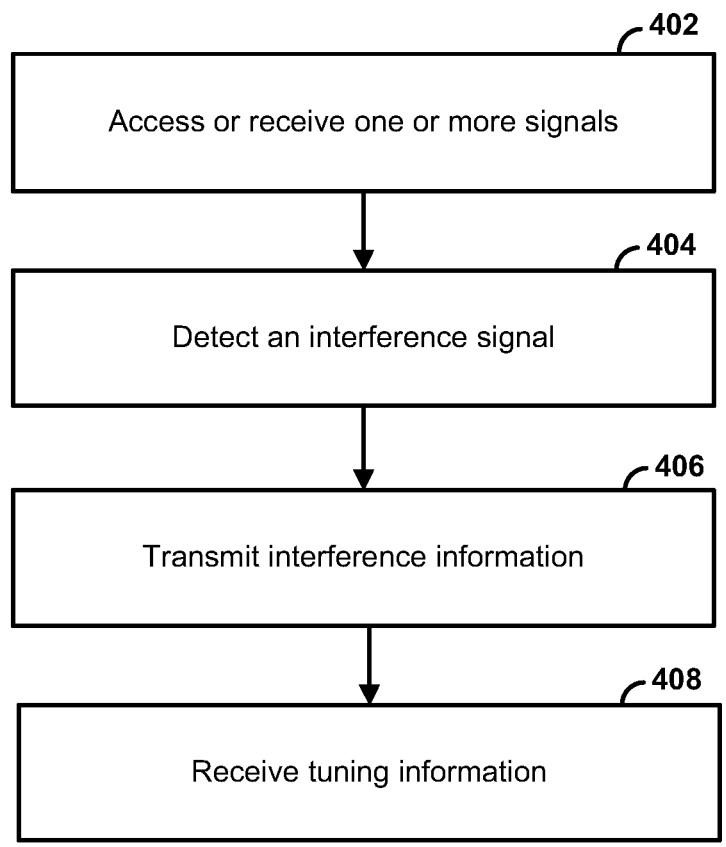
FIG. 4 is a flowchart illustrating another example method.

FIG. 4 is a flowchart illustrating another example method. At step 402, one or more signals can be accessed or received via a communication path. As an example, the one or more singles can be accessed or received by a user device (e.g., the first user device 102, the second user device 104) and/or the analysis element 112. In an aspect, the path comprises one or more communication channels. In an aspect, the path comprises one or more QAM channels. As an example, the one or more signals are transmitted at a respective center frequency. As a further example, each of the channels is associated with a respective center frequency.

At step 404, an interference signal exceeding an interference threshold can be detected. In an aspect, one or more of the first user device 102 and the second user device 104 can be configured (independently or in cooperation with the analysis element 112) to detect an interference signal exceeding an interference threshold. In an aspect, the interference signal can affect the one or more signals received via the communication path. In an aspect, the interference signal can affect one or more signal metrics associated with the one or more signals. In an aspect, a plurality of attributes about the one or more signals can be known. For example, a center frequency, a roll-off factor, a bandwidth, and/or a symbol rate can be a plurality of attributes that can be known about a signal. The plurality of known attributes can allow the methods and systems to know channel width and channel spacing of the signal. The space between two signals, e.g., a place where the communication path should not be receiving the one or more signals, can be called band gap. In another aspect, detecting the interference can comprise measuring interference signal power at one or more band gaps. In another aspect, detecting the interference can comprise measuring interference signal power at one or more band gaps and determining that the interference signal power is higher than a threshold value. As an example, interference can be caused by an appliance, such as a hairdryer or a microwave. Such interference can be detected by determining that a band gap in between two signals comprises an interference signal power that is higher than a threshold value. In an aspect, the detected interference can be caused by a second transmission mechanism. The band gaps can represent a difference between a bandwidth of a signal and a bandwidth of the second transmission mechanism. As an example, the band gaps can represent a difference between a bandwidth of a QAM signal and a bandwidth of a second transmission mechanism. As another example, the second transmission mechanism can use orthogonal frequency division multiplexing. For example, the second transmission mechanism can use orthogonal frequency division multiplexing for encoding data. As a further example, the second transmission mechanism is long-term evolution (LTE). In an aspect, the band gaps can reveal a difference between a bandwidth of a signal and a bandwidth of the second transmission mechanism. As an example, the band gaps can show a difference between a bandwidth of a QAM signal (e.g. 6 MHz wide) and a bandwidth of a second transmission mechanism (e.g. 10 MHz wide).

In an aspect, channel width and channel spacing of an interfering signal and a desired signal can be different. For example, when the interfering signal is wider than the desired signal, the interference signal can be detected in the presence of the desired signal. Detection of the desired signal can relate to a positive signal-to-noise ratio. This means that the interference signal level is below the desired signal level. In an aspect, the desired signal can have a channel width that is smaller than channel spacing, therefore resulting in a band gap. While signals still exist in the band gap, the levels of the desired signal are much lower in the band gap to prevent co-channel interference. When the level of the desired signal is low in the band gaps, the interfering signal can be detected within the band gap if channel width, channel spacing, and signal characteristics of the interfering signal are known. For example, OFDM signals use pilot subcarriers that transmit a known pattern with a known center frequency and modulation. Some of these pilots fall within a band gap so that a detector that is tuned for the pilots falling in the band gap can be detected even though the desired signal is higher than the interfering signal. Once presence of the pilots and levels of the pilots are detected in the band gap, an estimate can be made on a type of interference and a level of interference within the signal itself based on a known characteristic of the interfering signal. For example, the OFDM signal may be known to have a 711 MHz center frequency and a 10 MHz channel width. Due to the fact that the desired signals are much higher in level, it can be difficult to detect the 10 MHz wide interfering signal. However, if one or more pilots within the band gaps can be detected that match the expected pilots of the OFDM signal, then an estimation can be made that the interference is an OFDM signal with a 711 MHz center frequency and a 10 MHz channel width having a level around equal to the pilot levels.

At step 406, interference information relating to the interference signal can be transmitted from a customer-premises equipment (CPE) to a central location, such as a headend or server (e.g., analysis element 112) at a central location. As an example, the interference information can comprise information relating to the affected one or more signals, frequency of the interference, or both. For example, the interference information can comprise a type of interference such as advanced television systems committee (ATSC), LTE, OFDM, and/or pulses. As another example, the interference information can comprise a duty cycle of the interference such as continuous, often, sporadic, seldom, and the like. For example, once interference signal is detected on a frequency, the CPE can transmit information indicating the frequency experiencing interference to the central location. As another example, once interference is detected, the CPE can transmit information indicating the content represented by the one or more signals to the central location. Once the interference is detected, an alert can be triggered. In response to a triggered alert, interference information can be transmitted to a content provider 101*a*, 101*b* (FIGS. 1*a,b*-2*a,b*) or an entity managing a network. The interference information can be processed to determine, for example, if the content represented by the one or more signals affected by the interference can be delivered via a communications path that is an alternative to the communication channel experiencing interference. In an aspect, once interference is detected on a frequency, an alert can be sent to the CPE. The CPE can take corrective action in response to detecting an interference in a signal. See the description of FIG. 3 for more details on corrective action the CPE can take.

At step 408, tuning information based on the interference information can be received. In an aspect, the interference information can comprise a frequency experiencing interference, content presented on the frequency experiencing interference, and the like. In an aspect, if the interference information does not include the content presented on the frequency experiencing interference, then the central location can determine the content presented on the frequency experiencing interference by examining viewing information, such as information from an electronic programming guide (EPG) and/or metadata. Additionally, information about where a viewer was in the first content can be determined by examining the viewing information. For example, metadata of the first content can be examined to determine a start time. A current time can be compared to the determined start time to determine a time to begin playback. The content presented on the frequency experiencing interference can be considered first content. In an aspect, the tuning information can comprise instructions for circumventing the interference signal. As an example, the content provider 101*a*, 101*b* or an entity managing a network at the central location can determine that the first content is available on an alternative channel and/or source. In an aspect, the first content can be available on an alternative QAM channel (e.g., different frequency), available via VOD (or from a different source), and/or via an Internet protocol network. Alternatively, the content provider may place the content onto an alternative channel. Determining that the first content is available on an alternative channel and/or source can comprise examining viewing information, such as information from an electronic programming guide (EPG) and/or metadata. Determining that the first content is available on an alternative channel and/or source can comprise searching a database or a search engine. Once an alternative channel and/or source for the first content is found, information relating to the alternative channel and/or source can be transmitted to a CPE to facilitate tuning the CPE to a new channel or source of the first content. In another aspect, an alternative version of the first content can be provided. For example, the CPE may be consuming high definition first content via the first QAM channel, but could consume standard definition first content via VOD or a second QAM channel if the first QAM channel experiences interference. In an aspect, the systems and methods of the present disclosure allow the CPEs to selectively and dynamically receive content from an alternative source or channel. Such dynamic tuning of the CPEs aids in the frequency planning of the content providers, as such providers do not have the need for permanently avoiding certain frequencies. As an example, for typical broadcast systems, the same content can be available in HD, SD, on-Demand, and Internet systems. Usually only one of these systems can be impacted by a particular interference source. If one is watching a program in an HD broadcast system, and an interference is detected, then the same content can be viewed from an on-Demand system which is interference free. Alternatively, the interference source (e.g., another user device) can take corrective action. For example, the central location can instruct the interference source to use to an alternative channel, frequency, communication technique, content providing system, and the like, to minimize or remove interference.

Figure 5:
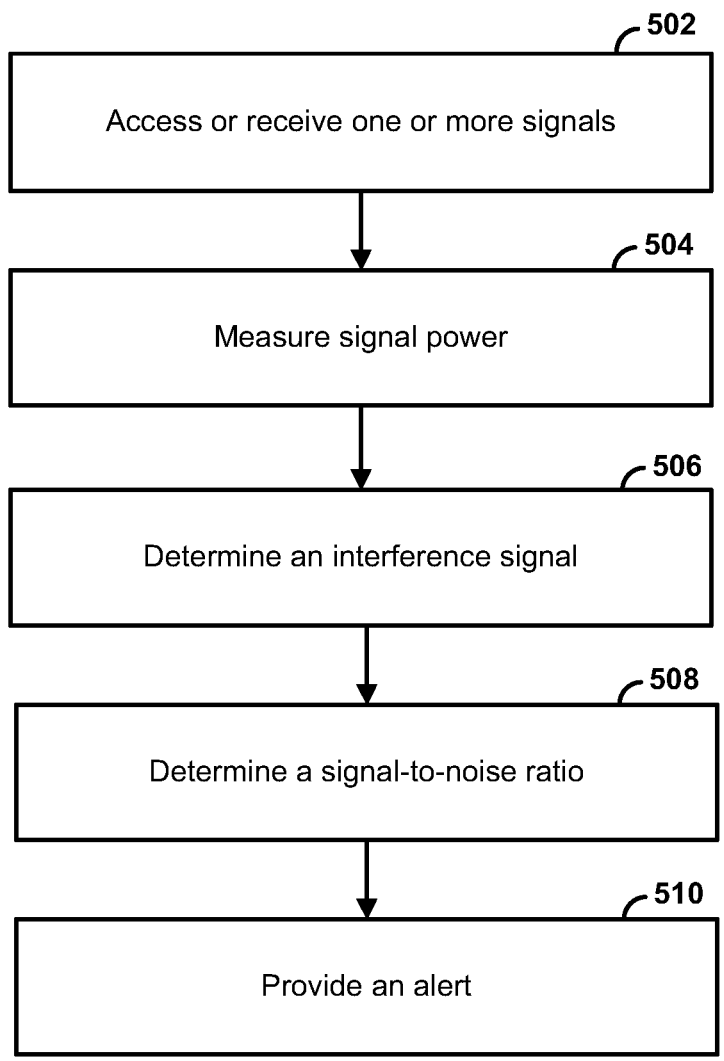
FIG. 5 is a flowchart illustrating yet another example method.

FIG. 5 is a flowchart illustrating yet another example method. At step 502, one or more signals can be accessed or received via a communication path, such as a QAM path. As an example, the one or more singles can be accessed or received by a user device (e.g., the first user device 102, the second user device 104) and/or the analysis element 112. In an aspect, the communication path can comprise one or more channels, such as QAM channels. As an example, the one or more signals can be transmitted at a respective center frequency. As a further example, each of the QAM channels can be associated with a respective center frequency.

At step 504, aggregate signal power associated with each of the one or more received signals can be measured. In an aspect, one or more of the first user device 102 and the second user device 104 can be configured (independently or in cooperation with the analysis element 112) to measure aggregate signal power associated with each of the one or more received signals. Aggregate signal power can comprise power associated with data and/or power associated with interference. As an example, the aggregate signal power can be measured in real-time. In another aspect, the one or more signals can be transmitted at a respective center frequency.

Figure 6:
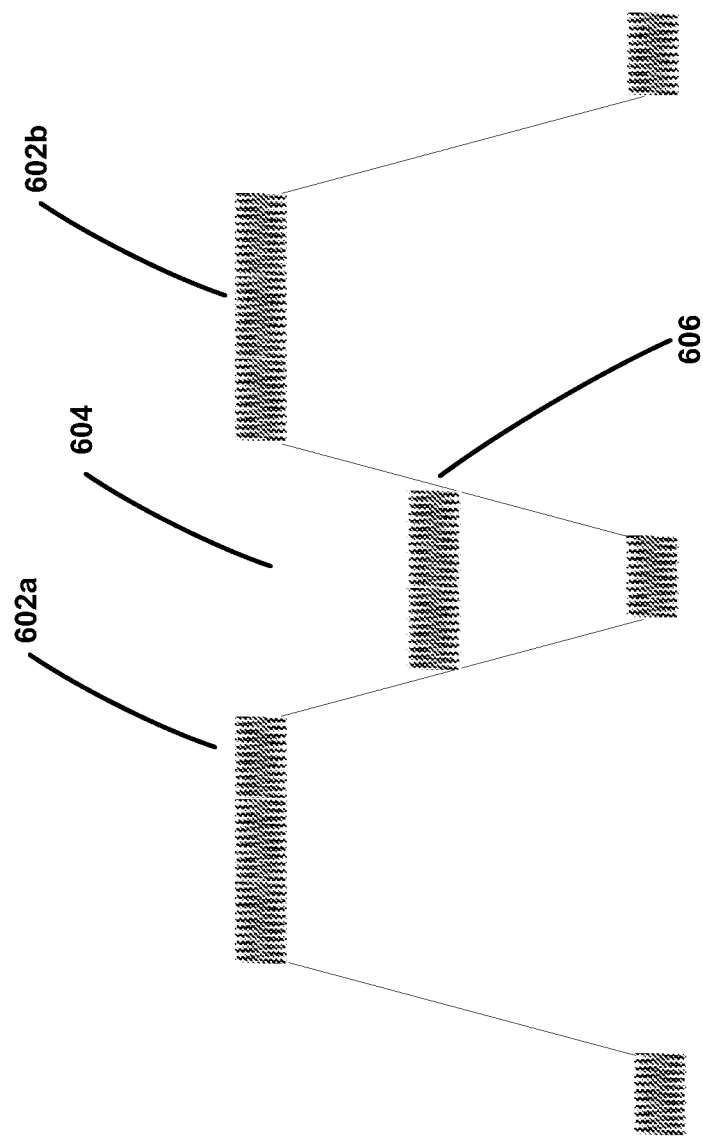
FIG. 6 is an exemplary diagram.

Turning now to FIG. 6, an exemplary diagram of signals 602a, 602b is illustrated. In an aspect, the signals 602a, 602b can be QAM signals. A band gap 604 can be the space between the two signals 602a, 602b. In an aspect, a roll-off factor can be a number representing how fast a transmitted signal 602a, 602b drops off after being filtered. In an aspect, a symbol rate, also known as a baud rate, can be a number of pulse or tone changes per second. In an aspect, a pilot signal can be a signal transmitted to control and/or supervise some aspect of the system.

At step 506, an interference signal power can be determined in a band gap frequency range. In an aspect, one or more attributes about the one or more signals such as an interference composite signal power, a center frequency and/or a channel width, an amplitude, phase, a frequency, a roll-off factor, a bandwidth, a symbol rate, pilots, patterns, and the like, can be known about a signal. The plurality of known attributes can allow the methods and systems to know channel width and channel spacing of the signal. The space between two signals 602a, 602b, e.g., a place where the communication path should not be receiving the one or more signals, can be called band gap 604. The range of frequencies within a band gap 604 can be called a band gap frequency range. In another aspect, detecting the interference 606 can comprise measuring interference signal power at one or more band gaps 604. In another aspect, detecting the interference 606 can comprise measuring interference signal power at one or more band gaps 604 and determining that the interference signal power is higher than a threshold value. As an example, interference 606 can be caused by an appliance, such as a hairdryer or a microwave. Such interference can be detected by determining that a band gap 604 in between two signals comprises an interference signal power that is higher than a threshold value. In an aspect, the detected interference 606 can be caused by a second transmission mechanism. The band gaps 604 can represent a difference between a bandwidth of a signal and a bandwidth of the second transmission mechanism. As an example, the band gaps 604 can represent a difference between a bandwidth of a QAM signal and a bandwidth of a second transmission mechanism. As another example, the second transmission mechanism can use orthogonal frequency division multiplexing. For example, the second transmission mechanism can use orthogonal frequency division multiplexing for encoding data. As a further example, the second transmission mechanism is long-term evolution (LTE). In another aspect, the interference signal power can relate to an interference signal 606 affecting the signal or signals. In an aspect, the band gaps 604 can reveal a difference between a bandwidth of a signal and a bandwidth of the second transmission mechanism. As an example, the band gaps 604 can show a difference between a bandwidth of a QAM signal (e.g. 6 MHz wide) and a bandwidth of a second transmission mechanism (e.g. 10 MHz wide).

At step 508, a signal-to-noise ratio can be determined by dividing the determined interference signal power by the measured aggregate signal power associated with one of the affected signals.

At step 510, an alert can be provided if the signal-to-noise ratio drops below a threshold value. In an aspect, the threshold value can be determined by a standard determined by a standards body, such as, for example, CableLabs. As an example, a threshold value of 41 dB could be used for downstream, carrier-to-premises communications. Of course, any other appropriate threshold value can be used.

In an aspect, in response to determining that the signal-to-noise ratio has dropped below a threshold value, a customer-premises equipment (CPE) can take corrective action. As an example, the CPE can determine a program on a frequency experiencing interference and determine if the program is available on an alternative channel and/or source. Determining if the program is available on an alternative channel and/or source can comprise examining information, such as information from an electronic programming guide (EPG) and/or metadata. Determining if the program is available on an alternative channel and/or source can comprise searching a database or a search engine. In another example, the CPE can transmit the frequency experiencing interference to a central location, such as a headend or server. The central location can determine a program on a frequency experiencing interference and determine if the program is available on an alternative channel and/or source. In yet another example, the CPE can transmit the frequency experiencing interference and the program on the frequency experiencing interference, and the central location can determine if the program is available on an alternative channel and/or source. If the program is available on an alternative channel and/or source, the CPE can be caused to tune to or otherwise receive the program via the alternative channel and/or source. Alternatively, an interference source (e.g., another user device) can take a corrective action. For example, the central location can instruct the interference source to use to an alternative channel, frequency, communication technique, content providing system, and the like, to minimize or remove interference.

Figure 7:
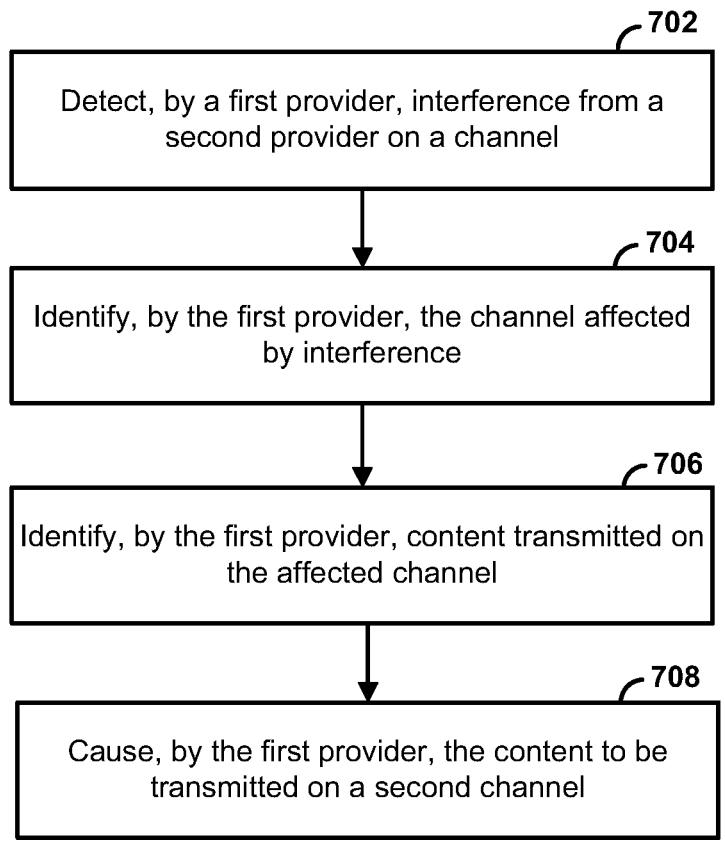
FIG. 7 is a flowchart illustrating an example method.

FIG. 7 is flowchart illustrating an example method. At step 702, a first provider can detect interference from a second provider on a channel. In an aspect, the first provider can be a service provider. In a further aspect, the first provider can be a multiple-system operator (MSO). In an aspect, the second provider can be a service provider. In a further aspect, the second provider can be a multiple-system operator (MSO). In an aspect, the second provider can provide log-term evolution (LTE) service. The first provider can detect interference at a central location, such as at a headend. The first provider can detect interference at a remote location, such as at a customer's premises equipment. In an aspect, interference can be detected using one or more signal metrics. As an example, the one or more signal metrics can be determined by a user device (e.g., the first user device 102, the second user device 104) and/or the analysis element 112. In an aspect, the one or more signal metrics can be associated with one or more signals transmitted via a communication channel or a communication path comprising one or more communication channels. In an aspect, the communication channel can be a quadrature amplitude modulation (QAM) channel or a communication path comprising one or more QAM channels. In another aspect, the one or more signal metrics can comprise device a signal power, an adaptive equalizer measurement, and/or a signal-to-noise ratio, or a combination thereof. As an example, the one or more signal metrics can be determined in real-time. In another aspect, the one or more signals can be transmitted at a respective center frequency.

At step 704, the first provider can identify the channel affected by the interference. In an aspect, interference can be detected in the one or more signals. In an aspect, one or more of the first user device 102 and the second user device 104 can be configured (independently or in cooperation with the analysis element 112) to detect interference on a particular frequency (channel). In an aspect, the interference can affect the one or more signals received via the communication path. In an aspect, the interference can affect one or more signal metrics associated with the one or more signals. In an aspect, a plurality of attributes about the one or more signals can be known. For example, a center frequency, roll-off factor, bandwidth, and symbol rate can comprise a plurality of attributes that can be known about a signal. For example, the plurality of known attributes can allow the methods and systems to know channel width and channel spacing of the signal. In an aspect, the space between two signals, e.g., a place where the communication path should not be receiving the one or more signals, can be called band gap. In another aspect, detecting, by the first provider, interference from a second provider on the channel can comprise measuring the interference signal power at one or more band gaps. In another aspect, detecting the interference can comprise measuring the interference signal power at one or more band gaps and determining that the interference signal power is higher than a threshold value (e.g., 0 dBm, −10 dBm, −20 dBm). As an example, interference can be caused by an appliance, such as a hairdryer or a microwave. Such interference can be detected by determining that a band gap in between two signals comprises an interference signal power that is higher than a threshold value. In an aspect, the detected interference can be caused by a transmission mechanism of the second provider. The band gaps can represent a difference between a bandwidth of a signal and a bandwidth of the second transmission mechanism. As an example, the band gaps can represent a difference between a bandwidth of a QAM signal and a bandwidth of a transmission mechanism of the second provider. As another example, detecting, by the first provider, interference from the second provider on a channel can comprise monitoring an orthogonal frequency division multiplexing subcarrier for interference. As a further example, the second transmission mechanism can be long-term evolution (LTE). In an aspect, the band gaps can reveal a difference between a bandwidth of a signal and a bandwidth of the second transmission mechanism. As an example, the band gaps can show a difference between a bandwidth of a QAM signal (e.g., 6 MHz wide) and a bandwidth of a second transmission mechanism (e.g., 10 MHz wide).

In an aspect, channel width and channel spacing of an interfering signal and a desired signal can be different. For example, when the interfering signal is wider than the desired signal, the interference signal can be detected in the presence of the desired signal. Detection of the desired signal can relate to a positive signal-to-noise ratio. This means that the interference signal level is below the desired signal level. In an aspect, the desired signal can have a channel width that is smaller than channel spacing, therefore resulting in a band gap. While signals still exist in the band gap, the levels of the desired signal are much lower in the band gap to prevent co-channel interference. When the level of the desired signal is low in the band gaps, the interfering signal can be detected within the band gap if channel width, channel spacing, and signal characteristics of the interfering signal are known. For example, OFDM signals use pilot subcarriers that transmit a known pattern with a known center frequency and modulation. Some of these pilots fall within a band gap so that a detector that is tuned for the pilots falling in the band gap can be detected even though the desired signal is higher than the interfering signal. Once presence of the pilots and levels of the pilots are detected in the band gap, an estimate can be made on a type of interference and a level of interference within the signal itself based on a known characteristic of the interfering signal. For example, the OFDM signal may be known to have a 711 MHz center frequency and a 10 MHz channel width. Due to the fact that the desired signals are much higher in level, it can be difficult to detect the 10 MHz wide interfering signal. However, if a one or more pilots within the band gaps can be detected that match the expected pilots of the OFDM signal, then an estimation can be made that the interference is an OFDM signal with a 711 MHz center frequency and a 10 MHz channel width having a level around equal to the pilot levels.

Optionally, a strength of the interference can be determined based on the one or more signal metrics. In an aspect, the strength of the interference can be determined by a user device (e.g., the first user device 102, the second user device 104) and/or the analysis element 112. In an aspect, the interference strength can relate to an interference affecting the one or more signal metrics associated with the one or more signals. In another aspect, determining the interference strength can comprise measuring interference strength at one or more band gaps. In an aspect, the band gaps can represent a difference between a bandwidth of a signal and a bandwidth of a second transmission mechanism. As an example, the band gaps can represent a difference between a bandwidth of a QAM signal and a bandwidth of a second transmission mechanism. As another example, the second transmission mechanism can use orthogonal frequency division multiplexing. For example, the second transmission mechanism can use orthogonal frequency division multiplexing for encoding data. As a further example, the second transmission mechanism can be long-term evolution (LTE).

In step 706, the first provider can identify content transmitted on the affected channel. As an example, the CPE can determine a program on a frequency experiencing interference. Determining the program can comprise examining information, such as information from an electronic programming guide (EPG) and/or metadata. Determining the program can comprise searching a database or a search engine. In another example, the CPE can transmit the frequency experiencing interference to a central location, such as a headend or server. The central location can determine the program on the frequency experiencing interference.

In step 708, the first provider can cause the content to be transmitted on a second channel. As an example, the CPE can determine if the program is available on an alternative channel and/or source. Determining if the program is available on an alternative channel and/or source can comprise examining information, such as information from an electronic programming guide (EPG) and/or metadata. Determining if the program is available on an alternative channel and/or source can comprise searching a database or a search engine. In another example, the CPE can transmit the frequency experiencing interference to a central location, such as a headend or server. The central location can determine if the program is available on an alternative channel and/or source. In yet another example, the CPE can transmit the frequency experiencing interference and the program on the frequency experiencing interference, and the central location can determine if the program is available on an alternative channel and/or source. In an aspect, the first provider can cause the customer-premises equipment (CPE) to take corrective action. If the program is available on an alternative channel and/or source, the CPE can be caused to tune to or otherwise request/receive the program via the alternative channel and/or source. As an example, if an interference is LTE and a device causing the interference has WiFi capability, then the corrective action can comprise tuning the device communications to WiFi, rather than LTE. Alternatively, an interference source (e.g., another user device) can take corrective action. For example, the central location can instruct the interference source to use to an alternative channel, frequency, communication technique, content providing system, and the like, to minimize or remove interference. In an aspect, causing, by the first provider, the content to be transmitted on the second channel can comprise determining the second channel is transmitting the content and causing a user device to tune to the second channel. In an aspect, content transmitted on the first channel can be a higher resolution than content transmitted on the second channel. In an aspect, content transmitted on the first channel can be a lower resolution than content transmitted on the second channel. In an aspect, causing, by the first provider, the content to be transmitted on the second channel can comprise accessing the content from a server. In an aspect, the server can be a video on-demand server.

Figure 8:
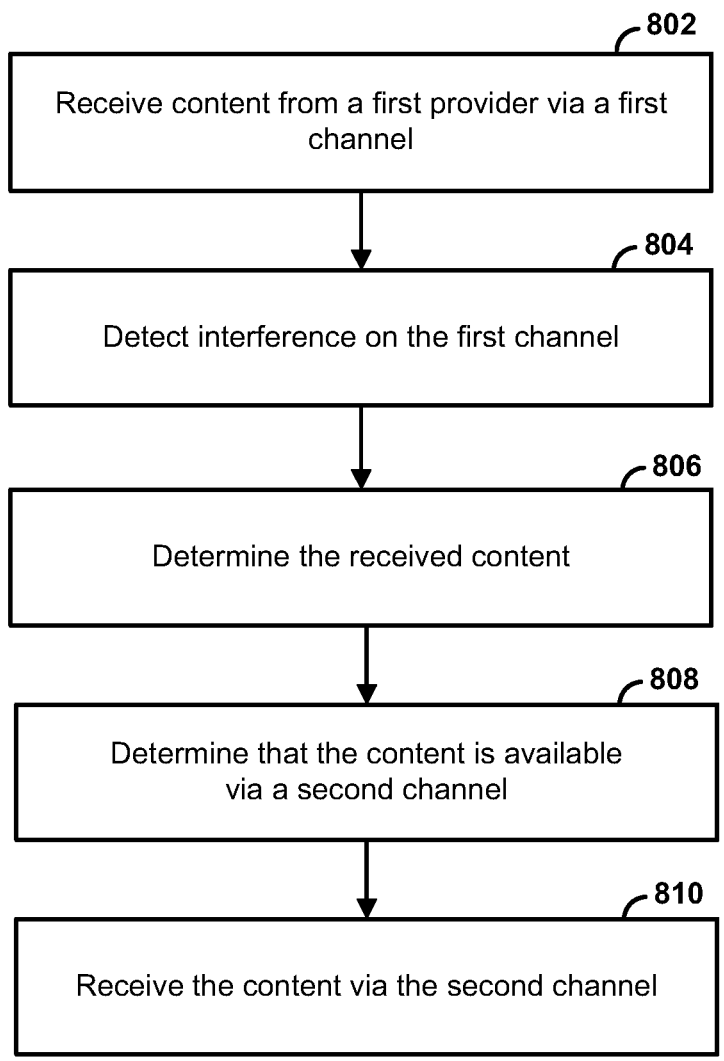
FIG. 8 is a flowchart illustrating an example method.

FIG. 8 is flowchart illustrating an example method. At step 802, content can be received from a first provider via a first channel. In an aspect, the content can be linear or stored. In an aspect, the content can be video only, audio only, audio/video, text, images, or the like. In an aspect, the first provider can be a service provider. In a further aspect, the first provider can be a multiple-system operator (MSO).

At step 804, interference can be detected on the channel. In an aspect, interference can originate from a second provider. In an aspect, the second provider can be a service provider. In a further aspect, the second provider can be a multiple-system operator (MSO). In an aspect, the second provider can provide log-term evolution (LTE) service. The first provider can detect interference at a central location, such as at a headend. The first provider can detect interference at a remote location, such as at a customer's premises equipment. In an aspect, interference can be detected using one or more signal metrics. As an example, the one or more signal metrics can be determined by a user device (e.g., the first user device 102, the second user device 104) and/or the analysis element 112. In an aspect, the one or more signal metrics can be associated with one or more signals transmitted via a communication channel or a communication path comprising one or more communication channels. In an aspect, the communication channel can be a quadrature amplitude modulation (QAM) channel or a communication path comprising one or more QAM channels. In another aspect, the one or more signal metrics can comprise device a signal power, an adaptive equalizer measurement, and/or a signal-to-noise ratio, or a combination thereof. As an example, the one or more signal metrics can be determined in real-time. In another aspect, the one or more signals can be transmitted at a respective center frequency. In an aspect, an interference can be detected in the one or more signals. In an aspect, one or more of the first user device 102 and the second user device 104 can be configured (independently or in cooperation with the analysis element 112) to detect interference on a particular frequency (channel). In an aspect, the interference can affect the one or more signals received via the communication path. In an aspect, the interference can affect one or more signal metrics associated with the one or more signals. In an aspect, a plurality of attributes about the one or more signals can be known. For example, a center frequency, roll-off factor, bandwidth, and symbol rate can comprise a plurality of attributes that can be known about a signal. For example, the plurality of known attributes can allow the methods and systems to know channel width and channel spacing of the signal. In an aspect, the space between two signals, e.g., a place where the communication path should not be receiving the one or more signals, can be called band gap. In another aspect, detecting, by the first provider, interference from a second provider on the channel can comprise measuring the interference signal power at one or more band gaps. In another aspect, detecting the interference can comprise measuring the interference signal power at one or more band gaps and determining that the interference signal power is higher than a threshold value (e.g., 0 dBm, −10 dBm, −20 dBm). As an example, interference can be caused by an appliance, such as a hairdryer or a microwave. Such interference can be detected by determining that a band gap in between two signals comprises an interference signal power that is higher than a threshold value. In an aspect, the detected interference can be caused by a transmission mechanism of the second provider. The band gaps can represent a difference between a bandwidth of a signal and a bandwidth of the second transmission mechanism. As an example, the band gaps can represent a difference between a bandwidth of a QAM signal and a bandwidth of a transmission mechanism of the second provider. As another example, detecting, by the first provider, interference from the second provider on a channel can comprise monitoring an orthogonal frequency division multiplexing subcarrier for interference. As a further example, the second transmission mechanism can be long-term evolution (LTE). In an aspect, the band gaps can reveal a difference between a bandwidth of a signal and a bandwidth of the second transmission mechanism. As an example, the band gaps can show a difference between a bandwidth of a QAM signal (e.g., 6 MHz wide) and a bandwidth of a second transmission mechanism (e.g., 10 MHz wide).

In an aspect, channel width and channel spacing of an interfering signal and a desired signal can be different. For example, when the interfering signal is wider than the desired signal, the interference signal can be detected in the presence of the desired signal. Detection of the desired signal can relate to a positive signal-to-noise ratio. This means that the interference signal level is below the desired signal level. In an aspect, the desired signal can have a channel width that is smaller than channel spacing, therefore resulting in a band gap. While signals still exist in the band gap, the levels of the desired signal are much lower in the band gap to prevent co-channel interference. When the level of the desired signal is low in the band gaps, the interfering signal can be detected within the band gap if channel width, channel spacing, and signal characteristics of the interfering signal are known. For example, OFDM signals use pilot subcarriers that transmit a known pattern with a known center frequency and modulation. Some of these pilots fall within a band gap so that a detector that is tuned for the pilots falling in the band gap can be detected even though the desired signal is higher than the interfering signal. Once presence of the pilots and levels of the pilots are detected in the band gap, an estimate can be made on a type of interference and a level of interference within the signal itself based on a known characteristic of the interfering signal. For example, the OFDM signal may be known to have a 711 MHz center frequency and a 10 MHz channel width. Due to the fact that the desired signals are much higher in level, it can be difficult to detect the 10 MHz wide interfering signal. However, if a one or more pilots within the band gaps can be detected that match the expected pilots of the OFDM signal, then an estimation can be made that the interference is an OFDM signal with a 711 MHz center frequency and a 10 MHz channel width having a level around equal to the pilot levels.

Optionally, a strength of the interference can be determined based on the one or more signal metrics. In an aspect, the strength of the interference can be determined by a user device (e.g., the first user device 102, the second user device 104) and/or the analysis element 112. In an aspect, the interference strength can relate to an interference affecting the one or more signal metrics associated with the one or more signals. In another aspect, determining the interference strength can comprise measuring interference strength at one or more band gaps. In an aspect, the band gaps can represent a difference between a bandwidth of a signal and a bandwidth of a second transmission mechanism. As an example, the band gaps can represent a difference between a bandwidth of a QAM signal and a bandwidth of a second transmission mechanism. As another example, the second transmission mechanism can use orthogonal frequency division multiplexing. For example, the second transmission mechanism can use orthogonal frequency division multiplexing for encoding data. As a further example, the second transmission mechanism can be long-term evolution (LTE).

In step 806, the received content can be determined. As an example, the CPE can determine a program on a frequency experiencing interference. Determining the program can comprise examining information, such as information from an electronic programming guide (EPG) and/or metadata. Determining the program can comprise searching a database or a search engine. In another example, the CPE can transmit the frequency experiencing interference to a central location, such as a headend or server. The central location can determine the program on the frequency experiencing interference.

In step 808, a determination can be made that the content is available via a second channel. As an example, the CPE determine if the program is available on an alternative channel and/or source. Determining if the program is available on an alternative channel and/or source can comprise examining information, such as information from an electronic programming guide (EPG) and/or metadata. Determining if the program is available on an alternative channel and/or source can comprise searching a database or a search engine. In another example, the CPE can transmit the frequency experiencing interference to a central location, such as a headend or server. The central location can determine if the program is available on an alternative channel and/or source. In yet another example, the CPE can transmit the frequency experiencing interference and the program on the frequency experiencing interference, and the central location can determine if the program is available on an alternative channel and/or source.

In step 810, the content can be received via the second channel. In an aspect, the second channel can be an alternative channel and/or source. If the program is available on an alternative channel and/or source, the CPE can be caused to tune to or otherwise request/receive the program via the alternative channel and/or source. In an aspect, receiving the content via the second channel can comprise tuning the user device to the second channel. In an aspect, content transmitted on the first channel can be a higher resolution than content transmitted on the second channel. In an aspect, content transmitted on the first channel can be a lower resolution than content transmitted on the second channel. In an aspect, receiving the content via the second channel can comprise accessing the content from a server. In an aspect, the server can be a video on-demand server.

Figure 9:
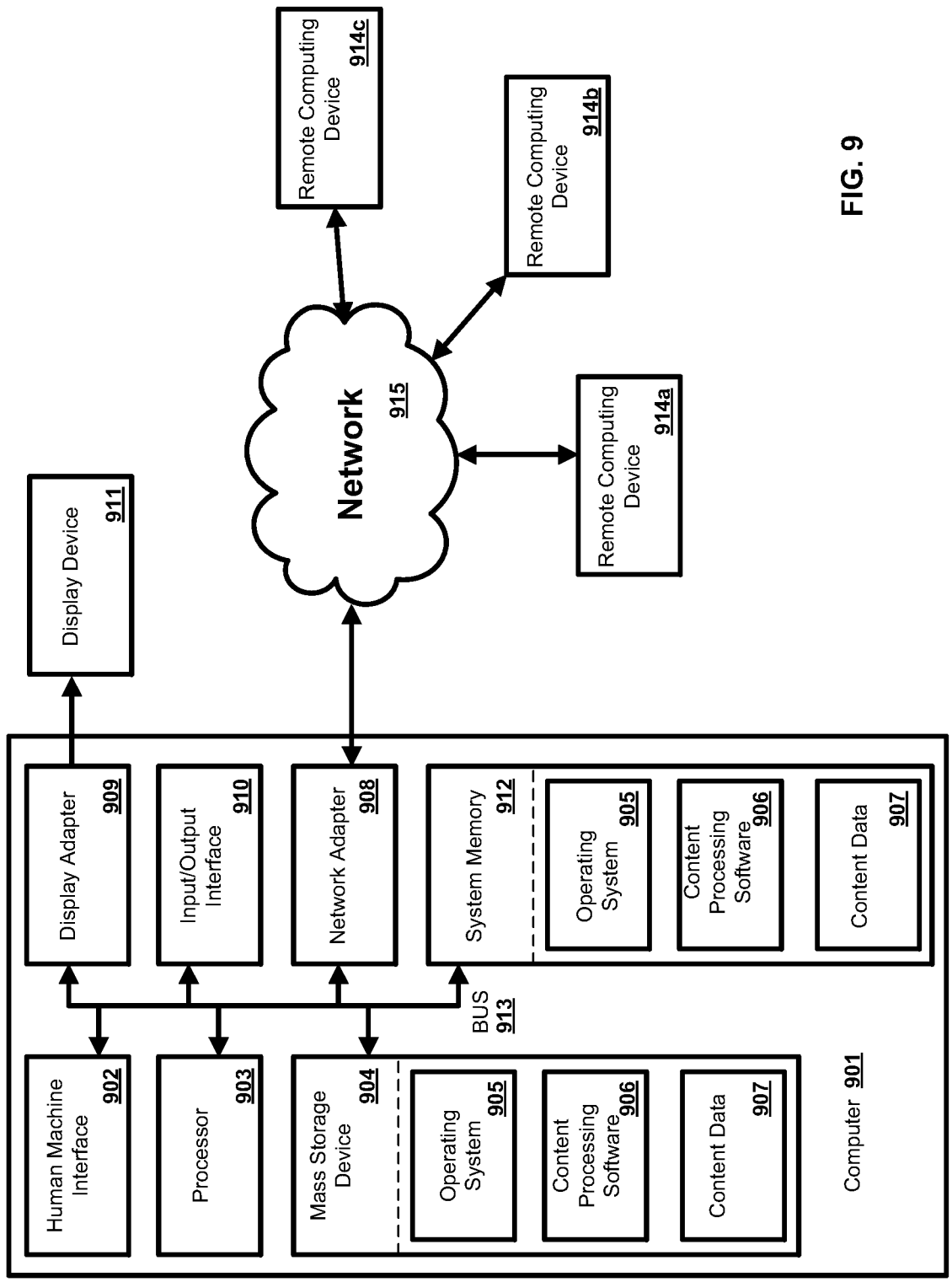
FIG. 9 is a block diagram illustrating an example computing device in which the present systems and methods can operate.

In an exemplary aspect, the methods and systems can be implemented on a computer 901 as illustrated in FIG. 9 and described below. By way of example, the computer 901 as illustrated in FIG. 9 can be first device 104, second device 105 of FIGS. 1a,b-2a,b. As another example, the remote computing devices 914a,b,c in FIG. 9 can be content provider 101a, 101b, first user device 102, second user device 104, and/or analysis element 112. Similarly, the methods and systems disclosed can utilize one or more computers to perform one or more functions in one or more locations. FIG. 9 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set-top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 901. The components of the computer 901 can comprise, but are not limited to, one or more processors or processing units 903, a system memory 912, and a system bus 913 that couples various system components including the processor 903 to the system memory 912. In the case of multiple processing units 903, the system can utilize parallel computing.

The system bus 913 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB), and the like. The bus 913, and all buses specified in this description can also be implemented over a wired or wireless network connection and each of the subsystems, including the processor 903, a mass storage device 904, an operating system 905, content processing software 906, content data 907, a network adapter 908, system memory 912, an Input/Output Interface 910, a display adapter 909, a display device 911, and a human machine interface 902, can be contained within one or more remote computing devices 914a,b,c at physically separate locations, connected through buses of this form, in effect implementing a fully distributed system.

The computer 901 typically comprises a variety of computer readable media. Exemplary readable media can be any available media that is accessible by the computer 901 and comprises, for example and not meant to be limiting, both volatile and non-volatile media, removable and non-removable media. The system memory 912 comprises computer readable media in the form of volatile memory, such as random access memory (RAM), and/or non-volatile memory, such as read only memory (ROM). The system memory 912 typically contains data, such as content data 907 and/or program modules, such as operating system 905 and content processing software 906 that are immediately accessible to and/or are presently operated on by the processing unit 903.

In another aspect, the computer 901 can also comprise other removable/non-removable, volatile/non-volatile computer storage media. By way of example, FIG. 9 illustrates a mass storage device 904 which can provide non-volatile storage of computer code, computer readable instructions, data structures, program modules, and other data for the computer 901. For example and not meant to be limiting, a mass storage device 904 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 904, including by way of example, an operating system 905 and content processing software 906. Each of the operating system 905 and content processing software 906 (or some combination thereof) can comprise elements of the programming and the content processing software 906. Content data 907 can also be stored on the mass storage device 904. Content data 907 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 901 via an input device (not shown). Examples of such input devices comprise, but are not limited to, a keyboard, pointing device (e.g., a "mouse"), a microphone, a joystick, a scanner, tactile input devices, such as gloves, and other body coverings, and the like These and other input devices can be connected to the processing unit 903 via a human machine interface 902 that is coupled to the system bus 913, but can be connected by other interface and bus structures, such as a parallel port, game port, an IEEE 1394 Port (also known as a Firewire port), a serial port, or a universal serial bus (USB).

In yet another aspect, a display device 911 can also be connected to the system bus 913 via an interface, such as a display adapter 909. It is contemplated that the computer 901 can have more than one display adapter 909 and the computer 901 can have more than one display device 911. For example, a display device can be a monitor, an LCD (Liquid Crystal Display), or a projector. In addition to the display device 911, other output peripheral devices can comprise components, such as speakers (not shown) and a printer (not shown) which can be connected to the computer 901 via Input/Output Interface 910. Any step and/or result of the methods can be output in any form to an output device. Such output can be any form of visual representation, including, but not limited to, textual, graphical, animation, audio, tactile, and the like. The display 911 and computer 901 can be part of one device, or separate devices.

The computer 901 can operate in a networked environment using logical connections to one or more remote computing devices 914a,b,c. By way of example, a remote computing device can be a personal computer, portable computer, smartphone, a server, a router, a network computer, a peer device or other common network node, and so on. Logical connections between the computer 901 and a remote computing device 914a,b,c can be made via a network 915, such as a local area network (LAN) and/or a general wide area network (WAN). Such network connections can be through a network adapter 908. A network adapter 908 can be implemented in both wired and wireless environments. Such networking environments are conventional and commonplace in dwellings, offices, enterprise-wide computer networks, intranets, and the Internet.

For purposes of illustration, application programs and other executable program components, such as the operating system 905 are illustrated herein as discrete blocks, although it is recognized that such programs and components reside at various times in different storage components of the computing device 901, and are executed by the data processor(s) of the computer. An implementation of content processing software 906 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information, such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence (AI) techniques, such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set-top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

The invention claimed is:

1. A method comprising:
receiving content from a first provider via a first channel outside a band gap indicative of a difference between a first bandwidth associated with the first channel and a second bandwidth associated with a second channel;
determining, based on a signal detected in the band gap indicative of the difference between the first bandwidth associated with the first channel and the second bandwidth associated with the second channel, interference on the first channel;
determining that the content is available on the second channel outside the band gap; and
receiving the content via the second channel.

2. The method of claim 1, wherein the content comprises at least one of: linear content, stored content, streaming content, video content, audio content, text, or images.

3. The method of claim 1, wherein the determining the interference is associated with a signal to noise ratio (SNR), a received signal strength indicator (RSSI), a path loss, or a packet loss.

4. The method of claim 1, wherein receiving the content via the second channel comprises tuning to the second channel.

5. The method of claim 1, wherein the first channel is associated with high resolution content and the second channel is associated with low resolution content.

6. The method of claim 1, wherein receiving the content via the second channel comprises accessing the content from a server.

7. The method of claim 1, further comprising sending, based on the interference, an alert.

8. The method of claim 1, further comprising causing, based on the interference, a mitigating action associated with the first channel.

9. The method of claim 1, wherein the first channel and the second channel are associated with a first network, and wherein the signal is received from a second network.

10. A system comprising:
a computing device configured to:
receive content from a first provider via a first channel outside a band gap indicative of a difference between a first bandwidth associated with the first channel and a second bandwidth associated with a second channel;
determine, based on a signal detected in the band gap indicative of the difference between the first bandwidth associated with the first channel and the second bandwidth associated with the second channel, interference on the first channel;
determine that the content is available on the second channel outside the band gap; and
receive the content via the second channel; and
a content source configured to:
send the content via the second channel.

11. The system of claim 10, wherein the content comprises at least one of: linear content, stored content, streaming content, video content, audio content, text, or images.

12. The system of claim 10, wherein the computing device is configured to determine the interference by determining at least one of: a signal to noise ratio (SNR), a received signal strength indicator (RSSI), a path loss, or a packet loss.

13. The system of claim 10, wherein the computing device configured to receive the content via the second channel is further configured to tune to the second channel.

14. The system of claim 10, wherein the computing device is further configured to request the content from the content source.

15. The system of claim 10, wherein the computing device is further configured to send, based on the interference, an alert.

16. The system of claim 10, wherein the first channel and the second channel are associated with a first network, and wherein the signal is received from a second network.

17. One or more non-transitory computer-readable media storing processor-executable instructions that, when executed by at least one processor, cause the at least one processor to:
   receive content from a first provider via a first channel outside a band gap indicative of a difference between a first bandwidth associated with the first channel and a second bandwidth associated with a second channel;
   determine, based on a signal detected in the band gap indicative of the difference between the first bandwidth associated with the first channel and the second bandwidth associated with the second channel, interference on the first channel;
   determine that the content is available on the second channel outside the band gap; and
   receive the content via the second channel.

18. The one or more non-transitory computer-readable media of claim 17, wherein the content comprises at least one of: linear content, stored content, streaming content, video content, audio content, text, or images.

19. The one or more non-transitory computer-readable media of claim 17, wherein the interference is associated with a signal to noise ratio (SNR), a received signal strength indicator (RSSI), a path loss, or a packet loss.

20. The one or more non-transitory computer-readable media of claim 17, wherein the processor-executable instructions further cause the at least one processor to send, based on the interference, an alert.

21. The one or more non-transitory computer-readable media of claim 17, wherein the processor-executable instructions further cause the at least one processor to execute, based on the interference, a mitigating action.

22. The one or more non-transitory computer-readable media of claim 17, wherein the processor-executable instructions further cause the at least one processor to receive the content via the second channel cause the at least one processor to tune to the second channel.

23. The one or more non-transitory computer-readable media of claim 17, wherein the first channel and the second channel are associated with a first network, and wherein the signal is received from a second network.

* * * * *